United States Patent Office 3,503,965
Patented Mar. 31, 1970

3,503,965
DERIVATIVES OF 1,4-BENZOTHIAZINE
André L. Langis, St. Laurent, Montreal, Quebec, Canada, assignor to American Home Products Corporation, New York, N.Y., a corporation of Delaware
No Drawing. Continuation-in-part of application Ser. No. 518,774, Jan. 5, 1966. This application Dec. 1, 1967, Ser. No. 687,098
Int. Cl. C07d 93/12; A61k 27/00
U.S. Cl. 260—243         5 Claims

ABSTRACT OF THE DISCLOSURE

There are disclosed herein 4-(p-chlorobenzoyl)-, 4-(p-fluorobenzoyl)-, 4 - (3,4,5 - trimethoxybenzoyl-, and 4-phenylcyclopropanecarbonyl - 2,3 - dihydro - 1,4 - benzothiazin-3-one-2-acetate. The compounds possess tranquilizing activity and exceptionally low toxicity, and methods for their preparation and use are also disclosed.

---

This application is a continuation-in-part of application Ser. No. 518,774, filed Jan. 5, 1966, now abandoned.

The present invention relates to derivatives of 1,4-benzothiazine of the general structure

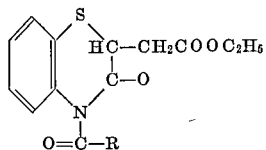

in which R represents an aromatic substituent such as a halogenated or alkoxylated phenyl group or an aromatic-cycloaliphatic radical such as the phenylcyclopropyl group.

The compounds of this invention possess depressant effects upon the central nervous system and an exceptionally low order of toxicity. In particular, the compounds of this invention are useful as tranquilizing agents, distinguished by the substantial absence of undesirable side-effects. As such, they may be formulated with suitable excipients such as lactose, starch, magnesium stearate or magnesium silicate in the form of tablets or capsules containing from 50 to 500 mg. of the active ingredient, or they may be formulated in the form of sterile solutions containing from 5 to 50 mg./ml. of the active ingredient for parenteral administration. Such tablets or capsules may be given orally in divided doses two to three times daily for a total dosage of from 2–100 mg. per kilogram body weight, or solutions for parenteral administration may be injected daily or several times daily in total doses of from 2–100 mg. per kilogram body weight, as directed by the physician.

More specifically, the compounds of this invention may be conveniently obtained by acylating ethyl 2,3-dihydro-1,4-benzothiazine-3-one-2-acetate, obtained as described by Mills and Whitworth in J. Chem. Soc. 1927, p. 2738, with acylating agent selected from the group consisting of suitably substituted benzoyl halides and phenylcyclopropane-1-carboxylic acid chlorides. The preferred acid halides are the acid chlorides. The acylation is most conveniently carried out in the presence of a basic condensing agent such as, for example, dimethylaniline, and the reaction product is isolated by solvent extraction and crystallization. The following formulae in which R has the significance denoted above, and examples will illustrate this invention. All compounds described in the following examples are identified by elemental analysis.

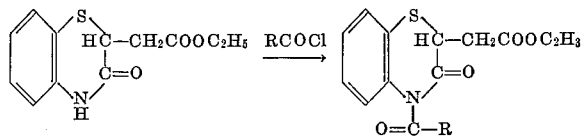

EXAMPLE 1

To a mixture of 12.56 g. (0.05 mole) of ethyl 2,3-dihydro-1,4-benzothiazine-3-one-2-acetate and 6.66 g. of dimethylaniline are added 9.6 g. of p-chlorobenzoyl chloride. The mixture is stirred and heated at 90° C. for 3 hours. After cooling, the product is dissolved in chloroform and washed with dilute hydrochloric acid and with water. The solvent is evaporated under reduced pressure. The product crystallizes on standing at room temperature. It is recrystallized from ethanol to yield ethyl 2,3-dihydro-4-(p-chlorobenzoyl)-1,4-benzothiazine-3-one - 2 - acetate, M.P. 101–103° C.

EXAMPLE 2

To a mixture of 54.25 g. (0.216 mole) of ethyl 2,3-dihydro-1,4-benzothiazine - 3 - one - 2 - acetate and 28.79 g. of dimethylaniline are added 36.68 g. of p-fluoro-benzoylchloride. The mixture is stirred and heated at 90-120° C. for 3 hours. After cooling, the product is dissolved in chloroform and washed with dilute hydrochloric acid and water. The solvent is evaporated under reduced pressure and the product crystallizes on standing at room temperature. It is recrystallized from a mixture of methanol and isopropanol to yield ethyl 2,3-dihydro-4-(p-fluorobenzoyl) - 1,4 - benzothiazine - 3 - one - 2 - acetate, M.P. 130–132° C.

EXAMPLE 3

To a mixture of 12.56 g. (0.05 mole) of ethyl 2,3-dihydro-1,4-benzothiazine-3-one-2-acetate and 6.66 g. of dimethylaniline are added 12.7 g. of 3,4,5-trimethoxybenzoyl chloride. The mixture is stirred and heated at 90–110° C. for 3 hours. After cooling, the product is dissolved in chloroform and washed with dilute hydrochloric acid and with water. The solvent is evaporated under reduced pressure and the product crystallizes on standing at room temperature. It is chromatographed on a silicic acid column. The product is recrystallized from methanol to yield ethyl 2,3-dihydro-4-(3,4,5-trimethoxybenzoyl)-1,4 - benzothiazine - 3 - one - 2 - acetate, M.P. 137–140° C.

EXAMPLE 4

To a mixture of 27.13 g. (0.108 mole) of ethyl 2,3-dihydro-1,4-benothiazine - 3 - one - 2 -acetate and 14.40 g. of dimethylaniline are added 21.5 g. of trans-2-phenyl-cyclopropane-1-carboxylic acid chloride. The mixture is stirred and heated at 90–110° C. for 3 hours. After cooling, the product is dissolved in chloroform and washed with dilute hydrochloric acid and water. The solvent is evaporated under reduced pressure and the product is chromatographed on a silicic acid column. The product is recrystallized from isopropanol to yield ethyl 2,3-dihydro - 4 - phenylcyclopropanecarbonyl - 1,4 - benzothiazine-3-one-2-acetate, M.P. 102.5° C.

I claim:
1. A compound of the formula

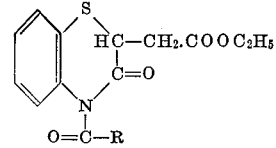

wherein R is a substituent selected from the group which consists of halogenated phenyl, 3,4,5-trimethoxyphenyl-cyclopropyl radicals.

2. Ethyl 2,3-dihydro-4-(p-chlorobenzoyl)-1,4 - benzothiazine-3-one-2-acetate, as claimed in claim 1.

3. Ethyl 2,3-dihydro-4-(p-fluorobenzoyl) - 1,4 - benzothiazine-3-one-2-acetate, as claimed in claim 1.

4. Ethyl 2,3-dihydro - 4 - (3,4,5 - trimethoxybenzoyl)-1,4-benzothiazine-3-one-2-acetate, as claimed in claim 1.

5. Ethyl 2,3-dihydro-4 - phenylcyclopropane-carbonyl-1,4-benzothiazine-3-one-2-acetate, as claimed in claim 1.

References Cited

UNITED STATES PATENTS

| | | | |
|---|---|---|---|
| 2,841,582 | 7/1958 | Zimmermann | 260—243 |
| 2,879,270 | 3/1959 | Kirchner et al. | 260—243 |
| 2,894,946 | 7/1959 | Kirchner | 260—243 |
| 2,956,054 | 10/1960 | Laubach | 260—243 |
| 3,341,519 | 9/1967 | Krapcho | 260—243 XR |

OTHER REFERENCES

Bourdais: Bull. Soc. Chim., France (1962), pp. 1709–11.

HENRY R. JILES, Primary Examiner

JOHN M. FORD, Assistant Examiner

U.S. Cl. X.R.

260—999